(12) United States Patent
Iitsuka

(10) Patent No.: US 6,282,704 B1
(45) Date of Patent: Aug. 28, 2001

(54) METHOD FOR ANALYZING ARRAY SUMMARY FOR LOOP INCLUDING LOOP EXIT STATEMENT

(75) Inventor: Takayoshi Iitsuka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/201,818

(22) Filed: Dec. 1, 1998

(30) Foreign Application Priority Data

Dec. 3, 1997 (JP) .................................................. 9-348471

(51) Int. Cl.$^7$ ...................................................... G06F 9/45
(52) U.S. Cl. ........................................ 717/6; 717/8; 717/9
(58) Field of Search .................... 717/4, 5, 6, 8, 717/9

(56) References Cited

U.S. PATENT DOCUMENTS

| | | | |
|---|---|---|---|
| 5,146,594 | * | 9/1992 | Iitsuka ........................................ 717/8 |
| 5,230,050 | * | 7/1993 | Iitsuka ........................................ 717/7 |
| 5,361,354 | * | 11/1994 | Greyzck ..................................... 717/9 |
| 5,396,627 | * | 3/1995 | Iitsuka ........................................ 717/9 |
| 5,414,849 | * | 5/1995 | Yamamoto ................................. 717/6 |
| 5,437,034 | * | 7/1995 | Tanaka et al. ............................. 717/6 |
| 5,790,859 | * | 8/1998 | Sarkar ........................................ 717/4 |
| 5,812,852 | * | 9/1998 | Poulsen et al. ........................... 717/6 |
| 5,832,272 | * | 11/1998 | Kalantery .................................. 717/6 |
| 5,862,385 | * | 1/1999 | Iitsuka ........................................ 717/9 |
| 5,953,531 | * | 9/1999 | Megiddo et al. .......................... 717/9 |
| 5,966,534 | * | 10/1999 | Cooke et al. ............................. 717/5 |

OTHER PUBLICATIONS

Koo et al.; "A transformation method to reduce loop overhead in HPF compiler". IEEE Xplore[online], High Performance Computing on the Information Superhighway, 1997, ISBN: 0–8186–7901–8, pp 306–311, Apr. 1997.*

Rauchwerger et al.; "Parallelizing while loops for multiprocessor systems", IEEE Xplore[online], Proceedings of the 9th International Parallel Processing Symposium, 1995, ISBN: 0–8186–7074–6, pp 347–356, Apr. 1995.*

(List continued on next page.)

Primary Examiner—Mark R. Powell
Assistant Examiner—Kelvin Booker
(74) Attorney, Agent, or Firm—Mattingly, Stanger & Malur, P.C.

(57) ABSTRACT

A method for analyzing an array summary to improve the accuracy of an array summary analysis of a loop containing a loop exit statement, thereby to improve applicability of array privatization. If a loop exit statement and a statement that sets the value of a loop control variable at loop exit to a scalar variable are contained within a loop, the upper bound of the loop control variable of the loop is replaced by the scalar variable in the array summary of the loop body and the result of eliminating the loop control variable by a variable elimination method is defined as the array summary of the loop, whereby the array summary is computed without approximation.

7 Claims, 9 Drawing Sheets

OTHER PUBLICATIONS

Blume et al.; "Restructuring programs for high–speed computers with Polaris". IEEE Xplore[online], Proceedings of the 1996 ICPP Workshop on Challenges Parallel Processing, 1996, ISBN: 0–8186–7623–X, pp 149–161, Apr. 1996.*

Maydan et al.; "Array–data flow analysis and its use in array privitization". ACM Digital Library[online], 20th ACM symposium on Principles of Programming Languages, pp 2–15, Jan. 1993.*

Li, Z.; "Array privatization for parallel execution of loops". ACM Digital Library[online], Proceedings of the 1992 International Conference on Supercomputing, pp 313–322, Jul. 1992.*

Rauchwerger et al.; "The privatizing DOALL test: a run–time technique for DOALL loop identification and array privatization". ACM Digital Library[online], Proceedings of the 8th conference on ACM International Conferece on Supercomputing, pp 33–43, Jul. 1994.*

Rauchwerger et al.; "The LRPD test: speculative run–time parallelization of loops with privatization and reduction parallelization". ACM Digital Library[online], Proceedings of the Conference on Programming Language Design and Implementation, pp 218–232, Jun. 1995.*

Iitsuka, T.; "Flow–sensitive Interprocedural Analysis Method for Parallelization". IFIP Transactions A: Computer Science and Technology n A–23 1993, ISBN: 0–444–88464–5, pp 65–76, Jan. 1993.*

Burke et al.; "Interprocedural Dependence Analysis and Parallelization". Proceedings of the SIGPLAN Symposium on Compiler Construction, Jun. 1986, pp. 162–175.*

Callahan, D.; "The Program Summary Graph and Flow–Sensitive Interprocedual Data Flow Analysis". Proceedings of the SIGPLAN '88 Conference on Programming Language Design and Implementation, Jun. 1988, pp 47–56.*

Balasundaram et al.; "A Technique for Summarizing Data Access and It's Use in Parallelism Enhancing Transformations". Proceedings of the SIGPLAN '89 Conference on Programming Language Design and Implementation, Jun. 1989, pp. 41–53.*

Bacon et al.; "Compiler Transformations for High–Performance Computing". ACM Computing Surveys, Dec. 1994, vol. 26, No. 4, pp 345–420.*

Proceedings of the 8th International Workshop on Languages and Compilers for Parallel Computing, Aug., 1995, "Interprocedural Analysis for Parallelization", M. Hall et al, pp. 5–1–5–14.

* cited by examiner

FIG.4

Example of prior art source program

```
DO J=1,N          (L0)
    DO K=1,N          (L1)
        A(K)=...          (S1)
    END DO
    DO K=1,N          (L2)
        ...=A(K)          (S2)
    END DO
END DO
```

FIG.5

Example of prior art object program

```
DOALL J=1,N          (L0)
    PRIVATE TA(1;N)   (S0)
    DO K=1,N          (L1)
        TA(K)=...         (S1)
    END DO
    DO K=1,N          (L2)
        ...=TA(K)         (S2)
    END DO
END DO
```

FIG.6

Example of source program according to this invention

| | | |
|---|---|---|
| | DO J=1,N | (L0) |
| |   DO K=1,N | (L1) |
| |     KE=K | (S1) |
| |     A(K) =... | (S2) |
| |     IF(...) GOTO 10 | (S3) |
| |   END DO | |
| 10 | CONTINUE | (S4) |
| |   DO K=KE,N | (L2) |
| |     A (K) =... | (S5) |
| |   END DO | |
| |   DO K=1,N | (L3) |
| |     ...= A(K) | (S6) |
| |   END DO | |
| | END DO | |

FIG.7

Example of object program according to this invention

| | | |
|---|---|---|
| | DOALL J=1,N | (L0) |
| |   PRIVATE TA(1:N) | (S0) |
| |   DO K=1,N | (L1) |
| |     KE=K | (S1) |
| |     TA(K) =... | (S2) |
| |     IF(...) GOTO 10 | (S3) |
| |   END DO | |
| 10 | CONTINUE | (S4) |
| |   DO K=KE,N | (L2) |
| |     TA(K)=... | (S5) |
| |   END DO | |
| |   DO K=1,N | (L3) |
| |     ...= TA(K) | (S6) |
| |   END DO | |
| | END DO | |

FIG.8

Array summary
29

| | |
|---|---|
| Write(R) | A set of parts of array to which values may be written in R |
| MustWrite(R) | A set of parts of array to which values must be written in R |
| Read(R) | A set of parts of array from which values may be read written in R |
| ExposedRead(R) | A set of parts of array which may be read before values are written in R |

FIG.9

Array summaries in prior art embodiments

29

| Write(S2) | = φ |
| MustWrite(S2) | = φ |
| Read(S2) | = {A(w) \| 1<=K<=N, w=K } |
| ExposedRead(S2) | = {A(w) \| 1<=K<=N, w=K } |

(a)

| Write(L2(body)) | = φ |
| MustWrite(L2(body)) | = φ |
| Read(L2(body)) | = {A(w) \| 1<=K<=N, w=K } |
| ExposedRead(L2(body)) | = {A(w) \| 1<=K<=N, w=K } |

(b)

| Write(L2) | = φ |
| MustWrite(L2) | = φ |
| Read(L2) | = {A(w) \| 1<=w<=N} |
| ExposedRead(L2) | = {A(w) \| 1<=w<=N} |

(c)

| Write(L1) | = {A(w) \| 1<=w<=N } |
| MustWrite(L1) | = {A(w) \| 1<=w<=N } |
| Read(L1) | = φ |
| ExposedRead(L1) | = φ |

(d)

| Write(L0(body)) | = Write(L1) + Write(L2) |
| | = {A(w) \| 1<=w<=N} |
| MustWrite(L0(body)) | = MustWrite(L1) + MustWrite(L2) |
| | = {A(w) \| 1<=w<=N} |
| Read(L0(body)) | = Read(L1) + Read(L2) |
| | = {A(w) \| 1<=w<=N} |
| ExposedRead(L0(body)) | = (ExposedRead(L2) - MustWrite(L1) + ExposedRead(L1) |
| | = φ |

Prior art array summaries containing loop exit

29

| | |
|---|---|
| Write(L3) | $= \phi$ |
| MustWrite(L3) | $= \phi$ |
| Read(L3) | $= \{A(w) \mid 1<=w<=N\}$ |
| ExposedRead(L3) | $= \{A(w) \mid 1<=w<=N\}$ |

(a)

| | |
|---|---|
| Write(L2) | $= \{A(w) \mid KE<=w<=N\}$ |
| MustWrite(L2) | $= \{A(w) \mid KE<=w<=N\}$ |
| Read(L2) | $= \phi$ |
| ExposedRead(L2) | $= \phi$ |

(b)

| | |
|---|---|
| Write(L1) | $= \{A(w) \mid 1<=w<=N\}$ |
| MustWrite(L1) | $= \phi$ |
| Read(L1) | $= \phi$ |
| ExposedRead(L1) | $= \phi$ |

(c)

| | |
|---|---|
| Write(L0(body)) | = Write(L1) + Write(L2) + Write(L3) |
| | $= \{A(w) \mid 1<=w<=N\}$ |
| MustWrite(L0(body)) | = MustWrite(L1) + MustWrite(L2) |
| | + MustWrite(L3) |
| | $= \{A(w) \mid KE<=w<=N\}$ |
| Read(L0(body)) | = Read(L1) + Read(L2) + Read(L3) |
| | $= \{A(w) \mid 1<=w<=N\}$ |
| ExposedRead(L0(body)) | =((ExposedRead(L3) - MustWrite(L2) |
| | + ExposedRead(L2)) - MustWrite(L1)) |
| | + ExposedRead(L1) |
| | $= \{A(w) \mid 1<=w<=KE\}$ |

Array summaries containing loop exit according to this invention

29

| | |
|---|---|
| Write(L1(body)) | = {A(w) \| 1<=K<=N, w=K} |
| MustWrite(L1(body)) | = {A(w) \| 1<=K<=N, w=K} |
| Read(L1(body)) | = $\phi$ |
| ExposedRead(L1(body)) | = $\phi$ |

(a)

| | |
|---|---|
| Write(L1(body)) | = {A(w) \| 1<=K<=KE, w=K} |
| MustWrite(L1(body)) | = {A(w) \| 1<=K<=KE, w=K} |
| Read(L1(body)) | = $\phi$ |
| ExposedRead(L1(body)) | = $\phi$ |

(b)

| | |
|---|---|
| Write(L1) | = {A(w) \| 1<=w<=KE} |
| MustWrite(L1) | = {A(w) \| 1<=w<=KE} |
| Read(L1) | = $\phi$ |
| ExposedRead(L1) | = $\phi$ |

(c)

| | |
|---|---|
| Write(L0(body)) | = Write(L1) + Write(L2) + Write(L3) |
| | = {A(w) \| 1<=w<=N} |
| MustWrite(L0(body)) | = MustWrite(L1) + MustWrite(L2) + MustWrite(L3) |
| Read(L0(body)) | = {A(w) \| KE<=w<=N} |
| | = Read(L1) + Read(L2) + Read(L3) |
| | = {A(w) \| 1<=w<=N} |
| ExposedRead(L0(body)) | =((ExposedRead(L3) - MustWrite(L2) + ExposedRead(L2)) - MustWrite(L1)) + ExposedRead(L1) |
| | = $\phi$ |

(d)

METHOD FOR ANALYZING ARRAY SUMMARY FOR LOOP INCLUDING LOOP EXIT STATEMENT

BACKGROUND OF THE INVENTION

This invention relates to a method for analyzing array summaries without approximation for a loop containing a loop exit statement.

Parallel compilers execute a variety of transformations for parallelization of programs to improve the execution performance of the programs. The transformations for parallelization are primarily applied to loops. Arbitrary transformations for parallelization are not applicable to the loops, but it must be determined which transformations for parallelization are applicable.

The nucleus of determining whether transformations for parallelization are applicable is reference analysis of data within a loop. Data referenced within a loop include scalar variables and arrays. Each scalar variable always references the same memory area. In contrast to this, in the case of arrays, since different memory areas are referenced depending on the values of subscripts, it is necessary to analyze how which part of which array is referenced within a loop.

Accordingly, for parallel compilers to determine whether transformations for parallelization are applicable, an array summary analysis is developed to analyze the parts of each array referenced within a loop and the characteristics of the references. The array summary analysis is shown in M. Hall, B. Murphy, S. Amarasinghe, S. Liao, M. Lam, "Interprocedural analysis for parallelization, Proceedings of the 8th International Workshop on Languages and Compilers for Parallel Computing", Springer-Verlag, August 1995.

A program example in FIG. 4 will be used to describe an array summary analysis for determining whether transformations for parallelization called array privatization are applicable to an array A. The array summary analysis analyzes array reference to obtain an array summary in FIG. 8 in a bottom-up fashion from the innermost loop toward outer loops while tracing the program in the reverse of program execution order.

In FIG. 8, R denotes a statement, a loop body, a loop, and other program parts. The loop body refers to all statements within a loop; for example, the body of a loop L2 in FIG. 4 is only a statement S2. The loop body of a loop L is hereinafter represented as L(body). The array summary of a loop body is an array summary for one iteration of the loop and the array summary of a loop is an array summary for all iterations of the loop.

An array summary of a statement S2 becomes as shown in FIG. 9 (a). Since the loop L2 contains only the statement S2, the array summary of the loop L2 body is the array summary itself of S2 and becomes as shown in FIG. 9 (b). By eliminating the loop control variable K of loop L2 from the array summary of the loop L2 body by using a variable elimination method such as the Fourier-Motzkin variable elimination method, the array summary of the loop L2 becomes as shown in FIG. 9 (c). By performing the same processing for a statement S1 and a loop L1, the array summary of the loop L1 becomes as shown in FIG. 9 (d). Next, the array summary of loop L0 body is obtained as shown in FIG. 9 (e) from the array summaries of the loops L1 and L2.

In FIG. 9 (e), since ExposedRead of an array A becomes a null set in the loop L0 body, it is appreciated that all parts of the array from which values are read at each iteration of L0 have already been preset to values within the iteration. Hence, it is appreciated that, at each iteration of the loop L0, the values of array elements set in other iterations would not be read. Accordingly, by preparing a different array TA(1:N) for a different iteration of the loop L0 as substitution of the array A, it is appreciated that the iterations of the loop L0 can be executed independently of each other. The transformation of thus allocating arrays to memory areas independent of each other for each iteration is called array privatization.

Since array privatization allows the iterations of the loop L0 to be executed independently, parallelization can be implemented as shown in FIG. 5. DOALL indicates the beginning of a parallelization loop. A statement S0 indicates that the memory area of array TA (1:N) is allocated individually for each iteration of a loop.

The above-described prior art states that an array summary analysis should be conducted with approximation when loop exit exists within a loop. However, no specific approximation method was described in the above-described prior art.

It is generally known that a set that may be referenced can be approximated with a set containing the actual set, while a set that must be referenced can be approximated with a set contained in the actual set. Therefore, an array summary analysis could also be conducted for a loop containing loop exit if, of array summaries for the loop, a set of parts of the array to which values may be written, a set of parts of the array from which values may be read, and a set of parts of the array from which values may be read before a value is written are approximated with array summaries without loop exit, while a set of parts of the array to which values must be written is approximated with a null set.

Thus, a method for conducting an array summary analysis for a loop containing loop exit is possible by expanding the prior art.

However, there was a problem in the above-mentioned expansion of the prior art in that analysis accuracy is degraded by approximation, and transformations for parallelization may be determined to be inapplicable although actually applicable.

For example, since a loop L1 contains loop exit in a program in FIG. 6, a set MustWrite (L1) of parts of an array to which values must be written in the loop L1 is approximated with a null set. For this reason, as shown in FIG. 10, a set [ExposedRead(L0 (body))] of parts of an array from which values may be read before a value is written at each iteration of the loop L0 body does not become a null set and it could not be determined that the array A can be privatized in the loop L0. Consequently, the loop L0 could not be parallelized.

SUMMARY OF THE INVENTION

An object of this invention is to improve the accuracy of an array summary analysis of a loop containing a loop exit statement, thereby to improve applicability of array privatization.

To achieve the above object, according to a first invention, a method for analyzing array summary in a language processor that generates an object program from a source program, comprises: (a) a syntax analysis step for analyzing the syntax of the source program and generating intermediate code; (b) an array summary analysis step for generating, for each loop within the intermediate code, an array summary comprising a set of parts of an array to which values may be written in the loop, a set of parts of an array to which values must be written in the loop, a set of parts of an array from which values may be read in the loop, and a set of parts of an array from which values may be read before a value is written in the loop; (c) an array privatization step for allocating, based on the array summary, arrays to memory areas independent of each other for the loop within the intermediate code; (d) a loop parallelization step for performing parallelization for the loop within the intermediate code after transformation of the step (c); and (e) a code generation step for generating an object program for the intermediate code after transformation of the step (d). Furthermore, the step (b) includes: (f) a loop-exit-time control variable value array summary analysis step for computing, for a loop containing a loop exit statement and a statement that sets the value of a loop control variable at loop exit to a scalar variable, an array summary with the value of the scalar variable as the upper bound of the loop control variable.

Details of step (f) is that, if a loop exit statement and a statement that sets the value of a loop control variable at loop exit in a scalar variable are contained within a loop, the upper bound of the loop control variable of the loop is replaced by the scalar variable in the array summary of the loop body and the result of eliminating the loop control variable by a variable elimination method is defined as the array summary of the loop.

By the above arrangement, for a loop containing a loop exit statement, if the loop contains a statement to set the value of a loop control variable at loop exit in a scalar variable, since an array summary is computed without approximation, the accuracy of array summary analysis is improved and array parallelization becomes applicable.

BRIEF DESCRIPTION OF THE DRAWINGS

These and other features, objects and advantages of the present invention will become apparent from the following description when taken in conjunction with the accompanying drawings wherein:

FIG. 4 shows an example of a prior art source program.

FIG. 5 shows an example of a prior art object program.

FIG. 6 shows an example of a source program according to this invention.

FIG. 7 shows an example of an object program according to this invention.

FIG. 8 shows an array summary.

FIG. 9 shows array summaries in prior art embodiments.

FIG. 10 shows prior art array summaries containing loop exit.

FIG. 11 shows array summaries containing loop exit according to this invention.

DESCRIPTION OF PREFERRED EMBODIMENTS

This invention relates to a method for analyzing array summaries without approximation for a loop containing a loop exit statement. Hereinafter, one embodiment of this invention will be described using the accompanying drawings.

Figure 1:
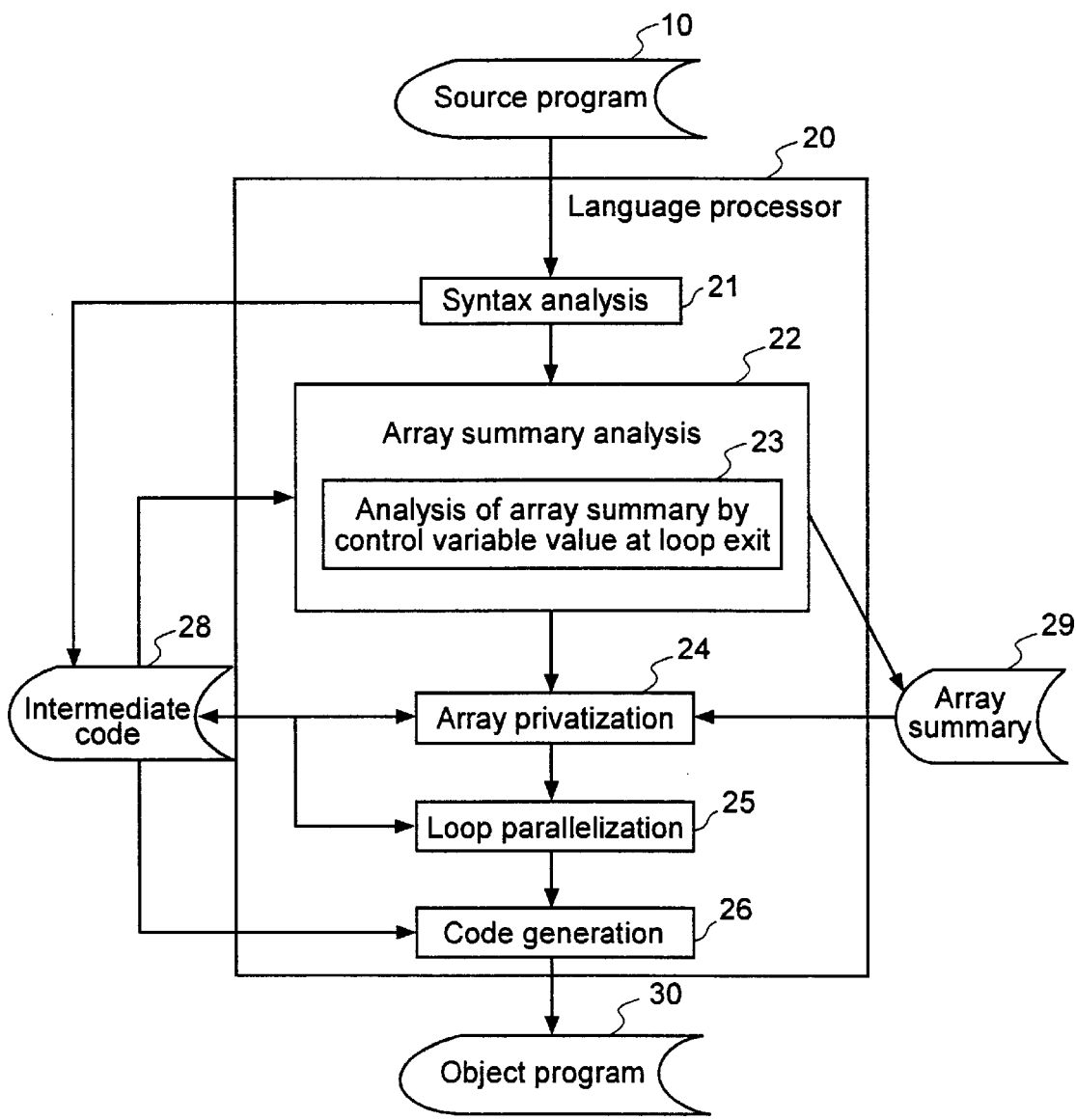
FIG. 1 shows the configuration of a language processor after this invention is implemented.

FIG. 1 shows the configuration of a language processor after this invention is implemented. The language processor 20 inputs a source program 10 and performs optimization such as loop parallelization to generate an object program 30. The source program is written in a programming language such as FORTRAN and C, and the object program 30 is a program consisting of machine instructions when the language processor 20 is a compiler, and it is a program consisting of a programming language such as FORTRAN and C when the language processor 20 is a preprocessor. The language processor 20 in FIG. 1 is a program executed in a processing unit.

Hereinafter, a description will be made of an example that the source program 10 is written in FORTRAN and the object program 30 is also one coded in FORTRAN. That is, a description will be made of a case where the language processor 20 is a preprocessor.

The language processor 20 consists of steps 21, 22, 24, 25, and 26. Of these steps, processing of step 23 is added in step 22, but other steps are well known in the art. Accordingly, other than step 22 will be briefly described.

Step 21 analyzes the syntax of the source program 10 and generates intermediate code 28.

Step 22 performs an array summary analysis that generates, for each loop within the intermediate code, an array summary 29 comprising a set of parts of an array to which values may be written by execution of the loop, a set of parts of an array to which values must be written in the loop, a set of parts of an array from which values may be read in the loop, and a set of parts of an array from which values may be read before a value is written in the loop.

Step 22 contains processing of step 23. Step 23 performs a loop-exit-time control variable value array summary analysis that computes, for a loop containing both a loop exit statement and a statement that sets the value of the loop control variable at loop exit in a scalar variable, an array summary 29 without approximation, with the value of the scalar variable as the upper bound of the loop control variable. Details of steps 22 and 23 will be given later.

Step 24 performs array privatization that allocates, based on the array summary 29, arrays to memory areas independent of each other for the loop within the intermediate code 28. Step 25 performs loop parallelization for the loop within the intermediate code 28 after transformation of step 24. Step 26 generates an object program 30 for the intermediate code 28 after transformation of step 25.

With the above configuration, for a loop containing a loop exit statement, if the loop contains a statement to set the value of a loop control variable at loop exit in a scalar variable, since the array summary 29 is analyzed without approximation by step 23, targets subject to application of the array privatization 24 will increase. That is, the applicability of the array privatization 24 will be improved.

Figure 2:
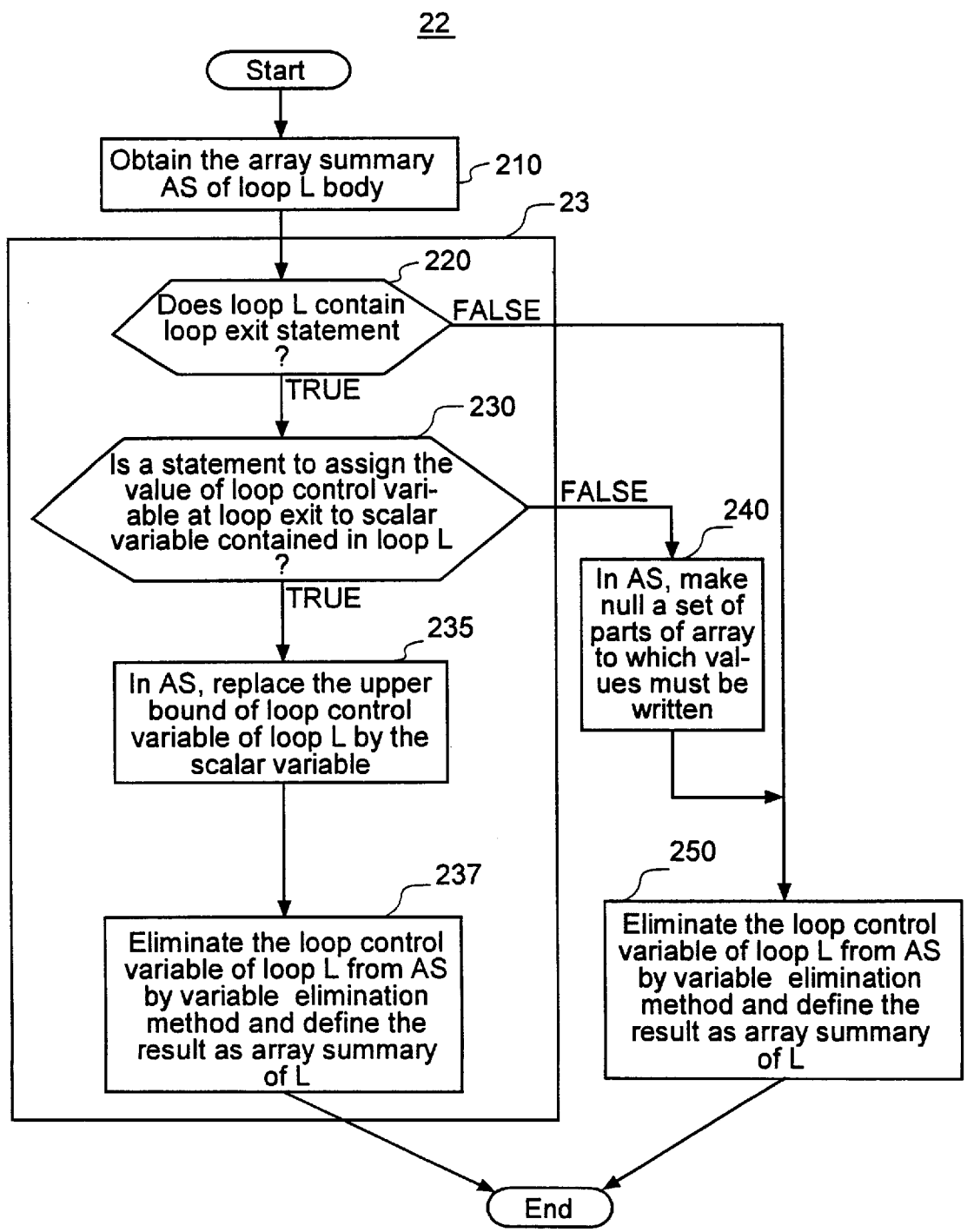
FIG. 2 is a processing flow of array summary analysis after this invention is implemented.

FIG. 2 is a detailed flow of steps 22 and 23 in FIG. 1. Steps 220, 230, 235, and 237 of the steps in FIG. 2 are details of step 23 in FIG. 1. In FIG. 2, an array summary 29 is computed for a given loop L.

Step 210 obtains the array summary 29 (hereinafter referred to as AS) of loop L body. The method for analyzing the array summary 29 of loop body will not be described in detail because it is well known; in analyzing the array summary 29 of loop body, step 22 in FIG. 1 is recursively called to obtain the array summary 29 of inner loop.

Step 220 determines whether the loop L contains a loop exit statement. If it is true, step 230 is executed, and if false, step 250 is executed.

Step 230 determines whether a statement to set the value of the loop control variable of the loop L at loop exit to a scalar variable is contained in the loop L. Details of this processing are given later. If the result of this processing is true, step 235 is executed, and if false, step 240 is executed.

Step 235 replaces the upper bound of the loop control variable of the loop L by the scalar variable in the array summary AS. Step 237 eliminates the loop control variable of the loop L from the array summary AS changed in step 235, and defines the result as the array summary of the loop L.

By steps 220, 230, 235, and 237, the array summary 29 can be computed without approximation for a loop containing a loop exit statement and a statement that sets the value of a loop control variable at loop exit in a scalar variable.

Step 240 performs approximation when a statement that sets the value of a loop control variable at loop exit in a scalar variable is not contained. Specifically, step 240 makes null a set of parts of an array to which values must be written. By executing step 250 after step 240, of the array summaries 29 for the loop, a set of parts of an array to which values may be written, a set of parts of an array from which values may be read, and a set of parts of an array from which values may be read before a value is written are approximated with an array summary having no loop exit, and a set of parts of an array to which values must be written is approximated with a null set.

Step 250 eliminates the loop control variable of loop L from the array summary AS by a variable elimination method and defines the result as the array summary of the loop L.

Although step 237 is executed as processing different from step 250 because it is part of processing of step 23 in FIG. 1, since these steps perform identical processing, step 250 may be executed after processing of step 235.

Figure 3:
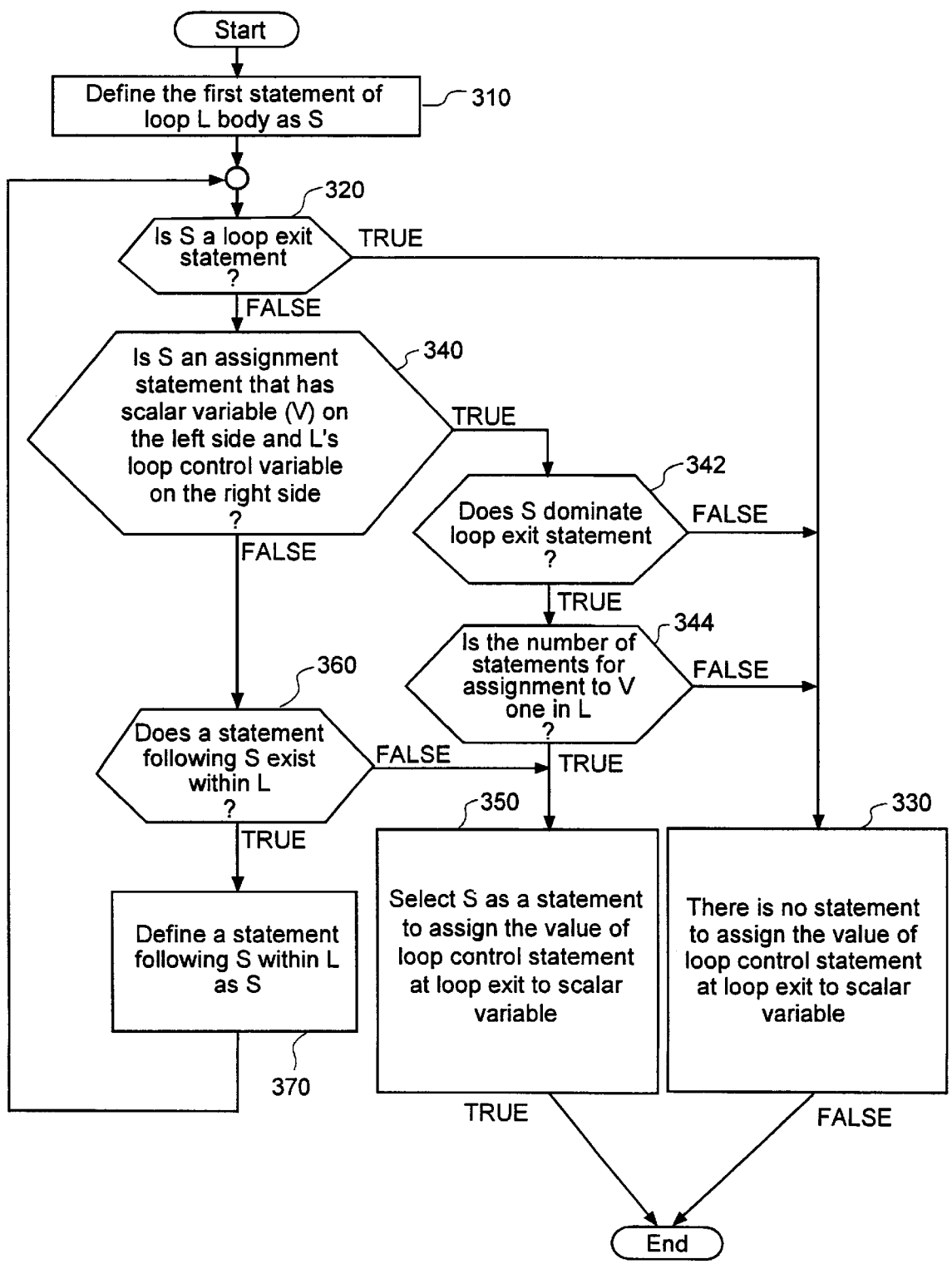
FIG. 3 is a detailed flow of step 230.

FIG. 3 is a detailed flow of step 230 in FIG. 2. Step 310 defines the first statement of loop L body as S.

Step 320 determines whether S is a loop exit statement, and if it is true, executes step 330, and otherwise executes step 340. Step 330 terminates processing, determining that there is no statement to set the value of a loop control statement at loop exit in a scalar variable.

Step 340 determines whether S is an assignment statement that has a scalar variable (hereinafter, referred to as V) on the left side and an L's loop control variable on the right side. If it is true, step 342 is executed, and otherwise step 360 is executed.

Step 342 determines whether S dominates a loop exit statement. If it is true, step 344 is executed, and otherwise step 330 is executed. Statement S1 dominating statement S2 denotes that S1 is executed in advance in all paths from the start of a program to S2. An analysis of domination relationship is not described in detail because it is well known.

Step 344 determines whether only one statement for assignment to the scalar variable V exists in L. If it is true, step 350 is executed, and otherwise step 330 is executed.

By steps 340, 342, and 344, it can be determined that the value of the loop control variable at loop exit is set in the scalar variable V by statement S. Step 350 terminates processing, determining that a statement to set the value of the loop control variable of loop L at loop exit to the scalar variable V is S.

Step 360 determines whether there is a statement following the statement S within the loop L. If it is true, step 370 is executed, and a statement following S within the loop L is defined as a new S and control is transferred to step 320 to repeat processing. If false, step 330 is executed.

Next, a source program example in FIG. 6 will be used to describe the effects of this invention. FIG. 11 shows array summaries 29 according to this invention for the source program example in FIG. 6. Loops L3 and L2 in the example of FIG. 6 are analyzed by the same array summary analysis as conventional one because they contain no loop exit statement and the same array summaries as those in FIGS. 10 (a) and 10 (b) are produced. Since the contents are identical, these array summaries are omitted in FIG. 11.

Since the loop L1 contains a loop exit statement S3, the evaluation result of step 220 in FIG. 2 becomes true and step 230 is executed. Step 230, according to the flow of FIG. 3, determines whether a statement to set the value of the loop control variable K of the loop L1 at loop exit in the scalar variable is contained in the loop L. As a result, it is determined that the statement S1 is such a statement, and step 235 is executed.

Step 235 replaces the upper limit of the loop control variable K of the loop L1 by an assignment target scalar variable KE of the statement S1 in the array summary 29 of loop L1 body. FIG. 11 (a) is the array summary 29 of the loop L1 body and FIG. 11 (b) is an array summary resulting from replacing the upper limit of the loop control variable K by an assignment target scalar variable KE of the statement S1.

Eliminating the loop control variable K of the loop L1 from FIG. 11 (b) produces an array summary in FIG. 11 (c), indicating that ExposedRead for the loop L1 has been expressed without approximation.

Computing an array summary 29 for the loop L0 based on FIG. 11 (d) produces an array summary shown in FIG. 11 (d), indicating that ExposedRead for the loop L0 body becomes a null set. Accordingly, it is appreciated that the array A within the loop L0 can be privatized.

From the above, in step 24 in FIG. 1, the array A is privatized within the loop L0, so that the loop L0 is parallelized in step 25 in FIG. 1. Therefore, the object program 30 shown in FIG. 7 is generated by processing of step 26.

This invention improves the accuracy of an array summary analysis of a loop containing a loop exit statement, thereby to improve applicability of array privatization. By this arrangement, the number of loops capable of parallelization increases and program execution speed is improved.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. A method for analyzing an array summary in a language processor that generates an object program from a source program, comprising:
   (a) a syntax analysis step for analyzing the syntax of the source program and generating intermediate code;
   (b) an array summary analysis step for generating, for each loop within the intermediate code, an array summary comprising a set of parts of an array to which values may be written in the loop, a set of parts of an array to which values must be written in the loop, a set of parts of an array from which values may be read in the loop, and a set of parts of an array from which values may be read before a value is written in the loop;

(c) an array privatization step for allocating, based on the array summary, arrays to memory areas independent of each other for the loop within the intermediate code;

(d) a loop parallelization step for performing parallelization for the loop within the intermediate code after transformation of step (c); and (e) a code generation step for generating an object program for the intermediate code after transformation of step (d), wherein step (b) includes:

(f) a loop-exit-time control variable value array summary analysis step for computing, for a loop containing a loop exit statement and a statement that sets the value of a loop control variable at loop exit to a scalar variable, an array summary with the value of the scalar variable as the upper bound of the loop control variable.

2. A method for analyzing array summary according to claim 1, wherein in step (f), if a loop exit statement and a statement that sets the value of a loop control variable at loop exit to a scalar variable are contained within a loop, the upper bound of the loop control variable of the loop is replaced by the scalar variable in the array summary of the loop body and the result of eliminating the loop control variable by a variable elimination method is stored in the array summary of the loop.

3. A method for analyzing array summary in a language processor that generates an object program from a source program, comprising the steps of:

(a) if a loop exit statement contained in intermediate code generated by the syntax analysis of the source program and a statement to set the value of a loop control variable at loop exit to a scalar variable are contained in a loop, replacing the upper bound of the loop control variable by the scalar variable in the array summary of the loop body; and (b) storing the result of eliminating the loop control variable from the result of the step (a) by a variable limination method in the array summary of the loop.

4. A method for analyzing array summary in a language processor that generates an object program from a source program, comprising the steps of:

(a) generating, for each loop within the intermediate code generated by the syntax analysis of the source program, an array summary comprising a set of parts of an array to which values may be written in the loop, a set of parts of an array to which values must be written in the loop, a set of parts of an array from which values may be read in the loop, and a set of parts of an array from which values may be read before a value is written in the loop; and (b) computing, for a loop containing a loop exit statement and a statement that sets the value of a loop control variable at loop exit to a scalar variable, an array summary with the value of the scalar variable as the upper bound of the loop control variable.

5. A method for analyzing array summary in a language processor that generates an object program from a source program, comprising the steps of:

(a) generating, for each loop within the intermediate code generated by the syntax analysis of the source program, an array summary comprising a set of parts of an array to which values may be written in the loop, a set of parts of an array to which values must be written in the loop, a set of parts of an array from which values may be read in the loop, and a set of parts of an array from which values may be read before a value is written in the loop;

(b) computing, for a loop containing a loop exit statement and a statement that sets the value of a loop control variable at loop exit to a scalar variable, an array summary with the value of the scalar variable as the upper bound of the loop control variable; and (c) if a loop exit statement and a statement that sets the value of a loop control variable at loop exit to a scalar variable are contained within a loop, the upper bound of the loop control variable of the loop is replaced by the scalar variable in the array summary of the loop body and the result of eliminating the loop control variable by a variable elimination method is stored in the array summary of the loop.

6. A method for analyzing array summary in a language processor that generates an object program from a source program, comprising:

(a) a syntax analysis step for analyzing the syntax of the source program and generating intermediate code;

(b) an array summary analysis step for generating an array summary comprising a plurality of sets of parts of array to or from which values may be written or read, for each loop within the intermediate code;

(c) an array privatization step for allocating, based on the array summary, arrays to memory areas independent of each other for the loop within the intermediate code;

(d) a loop parallelization step for performing parallelization for the loop within the intermediate code after transformation of step (c); and (e) a code generation step for generating an object program for the intermediate code after transformation of step (d), wherein step (b) includes:

(f) a loop-exit-time control variable value array summary analysis step for computing, for a loop containing a loop exit statement and a statement that sets the value of a loop control variable at loop exit to a scalar variable, an array summary with the value of the scalar variable as the upper bound of the loop control variable.

7. An array summary analysis method according to claim 6, wherein the array summary in step (b) comprises a set of parts of an array to which values may be written in the loop, a set of parts of an array to which values must be written in the loop, a set of parts of an array from which values may be read in the loop, and a set of parts of an array from which values may be read before a value is written in the loop.

* * * * *